United States Patent
Mohsinally

(10) Patent No.: US 9,686,341 B1
(45) Date of Patent: Jun. 20, 2017

(54) REVIEW TRENDS

(75) Inventor: Yusuf Moosbhoy Mohsinally, Santa Clara, CA (US)

(73) Assignee: A9.com, Inc., Palo Alto, CA (US)

( * ) Notice: Subject to any disclaimer, the term of this patent is extended or adjusted under 35 U.S.C. 154(b) by 687 days.

(21) Appl. No.: 12/544,583

(22) Filed: Aug. 20, 2009

(51) Int. Cl.
| | |
|---|---|
| G06F 15/16 | (2006.01) |
| G06F 15/177 | (2006.01) |
| G06Q 30/00 | (2012.01) |
| H04L 29/08 | (2006.01) |
| H04L 12/58 | (2006.01) |
| H04L 29/06 | (2006.01) |

(52) U.S. Cl.
CPC ............ *H04L 67/02* (2013.01); *H04L 12/585* (2013.01); *H04L 12/587* (2013.01); *H04L 12/5855* (2013.01); *H04L 29/06* (2013.01); *H04L 51/12* (2013.01); *H04L 51/24* (2013.01); *H04L 67/12* (2013.01)

(58) Field of Classification Search
CPC ....... H04L 67/02; H04L 67/12; H04L 12/585; H04L 12/5855; H04L 12/587; H04L 29/06; H04L 51/12; H04L 51/24
USPC ............. 709/217–220; 705/26.1, 26.61–26.7
See application file for complete search history.

(56) References Cited

U.S. PATENT DOCUMENTS

| | | | |
|---|---|---|---|
| 5,537,618 A * | 7/1996 | Boulton et al. ............... | 715/745 |
| 6,766,319 B1 * | 7/2004 | Might | |
| 7,240,077 B1 * | 7/2007 | Edelman et al. | |
| 7,336,613 B2 * | 2/2008 | Lloyd et al. ................. | 370/237 |
| 7,373,606 B2 * | 5/2008 | Gorzela ........................ | 715/738 |
| 7,421,429 B2 * | 9/2008 | Thota | |
| 7,428,496 B1 * | 9/2008 | Keller et al. ................. | 705/7.39 |
| 7,620,636 B2 * | 11/2009 | Fasciano | |
| 7,885,863 B2 * | 2/2011 | Ojakaar et al. .............. | 705/26.7 |
| 7,962,461 B2 * | 6/2011 | Ruhl et al. .................... | 707/706 |
| 8,150,724 B1 * | 4/2012 | Robinson ..................... | 705/7.31 |
| 8,229,782 B1 * | 7/2012 | Adams et al. ............... | 705/7.32 |
| 8,438,279 B2 * | 5/2013 | Brundage et al. ............ | 709/224 |
| 2002/0107861 A1 * | 8/2002 | Clendinning et al. ........ | 707/101 |
| 2006/0143158 A1 * | 6/2006 | Ruhl et al. ........................ | 707/3 |
| 2006/0161838 A1 * | 7/2006 | Nydam ................. | G06F 17/241 715/202 |
| 2006/0235709 A1 * | 10/2006 | Hamilton et al. ................. | 705/1 |
| 2006/0247980 A1 * | 11/2006 | Mirrashidi et al. ............. | 705/26 |
| 2006/0282762 A1 * | 12/2006 | Diamond .............. | G06F 17/241 715/235 |

(Continued)

OTHER PUBLICATIONS

Author Unknown, "Cstar Optics Cstar 8x25 Waterproof Compact Porro Prism Binoculars," published at http://www.gazaro.com/deal/amazon-cstar-8x25-waterproof-compact-porro-prism-binoculars-495956, pp. 1-6 (Publication date unknown) (As viewed Aug. 17, 2009).

(Continued)

*Primary Examiner* — Farzana Huq
(74) *Attorney, Agent, or Firm* — Thomas | Horstemeyer LLP

(57) ABSTRACT

Disclosed are various embodiments of a system. The system comprises a server, a memory accessible to the server, and a review trend generator configured to receive a request for a review trend corresponding to at least one item. The review trend generator is further configured to generate a review trend based at least in part upon a plurality of reviews of an item. The system further comprises a review trend encoder configured to encode the generated review trend for rendering on a network page.

24 Claims, 8 Drawing Sheets

(56) References Cited

U.S. PATENT DOCUMENTS

| | | | |
|---|---|---|---|
| 2006/0287989 A1* | 12/2006 | Glance | 707/3 |
| 2007/0078833 A1* | 4/2007 | Chea et al. | 707/3 |
| 2008/0082499 A1* | 4/2008 | Koski | G06F 17/30719 |
| 2008/0195462 A1* | 8/2008 | Magdon-Ismail et al. | 705/10 |
| 2008/0243733 A1* | 10/2008 | Black | 706/16 |
| 2008/0244431 A1* | 10/2008 | Chea et al. | 715/764 |
| 2009/0187438 A1* | 7/2009 | Selberg | 705/7 |
| 2009/0271768 A1* | 10/2009 | Goodson | 717/125 |
| 2009/0280783 A1* | 11/2009 | Klassen et al. | 455/414.1 |
| 2009/0299824 A1* | 12/2009 | Barnes, Jr. | G06F 3/04847 705/7.39 |
| 2010/0121707 A1* | 5/2010 | Goeldi | 705/14.49 |
| 2010/0121849 A1* | 5/2010 | Goeldi | 707/736 |
| 2010/0137032 A1* | 6/2010 | Okamoto et al. | 455/566 |
| 2011/0022602 A1* | 1/2011 | Luo et al. | 707/748 |
| 2011/0040787 A1* | 2/2011 | Cierniak et al. | 707/770 |
| 2013/0132814 A1* | 5/2013 | Mangini | G06F 17/24 715/230 |

OTHER PUBLICATIONS

Author Unknown, "Customizing charts: Screening and Comparing—Google Finance Help," published at http://www.google.com/support/finance/bin/answer.py?hl=en&answer=71885, 2009, p. 1 (Month of publication unknown) (As viewed and cached on Aug. 17, 2009).

* cited by examiner

Dynamic Review Page

Item:       Widget

Reviewer:   [                    ]

Rating:     [       ]

Comments:   [                    ]

Create a dynamic review?        ○ yes   ○ no
If yes, choose one of the following:

○ Update review to include a new rating if the condition occurs
  ○ Create another review to include new rating if a condition occurs Condition:  [                    ]

New Rating: [       ]

FIG. 9

REVIEW TRENDS

BACKGROUND

Customers may provide opinions of an item on the website of a vendor or in forums for discussing items for the benefit of other customers. Sometimes the customer opinions are provided in the form of a rating along with comments. A customer opinion of an item may change over time, but the opinions provided remain static.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIG. 9 is a drawing of one example of a user interface rendered on a display device of a client in the data communications network of FIG. 1 according to an embodiment of the present disclosure.

DETAILED DESCRIPTION

The following discussion describes systems and methods relating to the generation of a review trend according to various embodiments. For the sake of convenience, first a data communications network 100 is described followed by a discussion of the operation of the various components of the data communications network 100 according to various embodiments.

Figure 1:
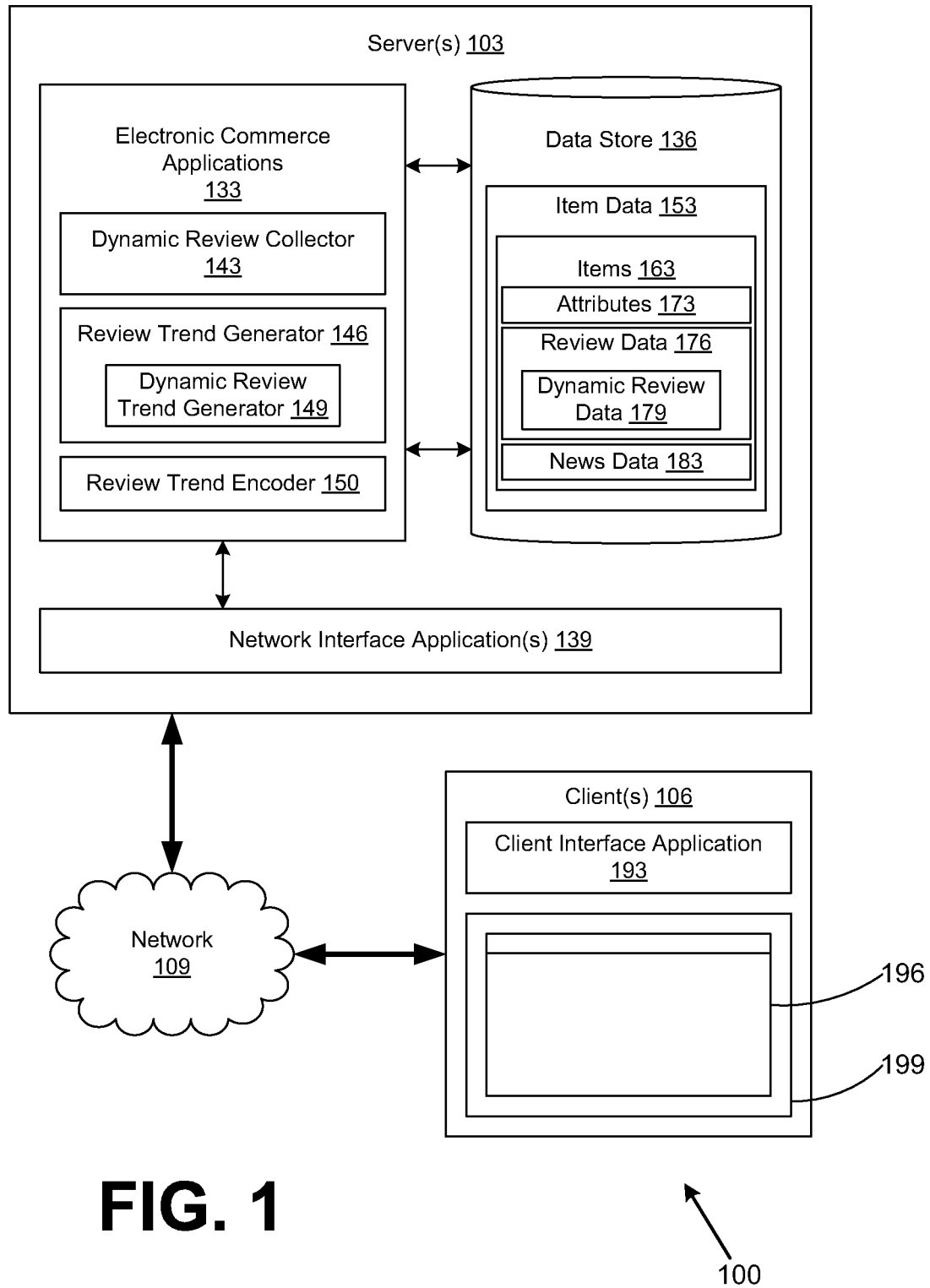
FIG. 1 is a drawing of an example of a data communications network according to an embodiment of the present disclosure.

With reference to FIG. 1, shown is an example of a data communications network 100 that includes a server 103 and a client 106. Both the server 103 and the client 106 are coupled to a network 109. The network 109 may comprise, for example, the Internet, intranets, extranets, wide area networks (WANs), local area networks (LANs), wired networks, wireless networks, or other suitable networks, etc., or any combination of two or more such networks.

A computing device such as, for example, a server 103 is employed to execute various applications that provide for the generation of a review trend, as will be described. In other embodiments, the computing device may be a desktop computer, laptop computer, mobile computing device, and/or one or more of a variety of other computing devices. To this end, the following discussion first describes the structural makeup of the various components of the data communications network 100, and then describes the operation of the same. Specifically, the server 103 may comprise, for example, a server computer or like system. The server 103 may represent multiple servers arranged, for example, in one or more server banks or other arrangements. Such servers 103 may be located in a single installation or may be dispersed among many different geographical locations. For purposes of convenience, the server 103 is referred to herein in the singular. However, in one embodiment, the server 103 represents a plurality of servers arranged as described above.

Various applications and data are stored or executed in the server 103 according to various embodiments. For example, the applications executed on the server 103 include one or more electronic commerce applications 133 that are executed to conduct the online presence of a merchant over a network 109 (such as the Internet or other network as can be appreciated). In addition, the applications executed in the server 103 further include a dynamic review collector 143, a review trend generator 146, and a review trend encoder 150 and/or other applications. In some embodiments, the review trend generator 146 includes a dynamic review trend generator 149.

In addition, a network interface application 139 is executed to provide for interaction between the applications on the server 103 and clients 106 as will be described. To this end, the network interface application 139 may comprise, for example, a web server application or similar application as can be appreciated.

The client 106 is representative of a plurality of clients coupled to the network 109. The client 106 may comprise, for example, a processor-based system such as computer system. Such a computer system may be embodied in the form of a desktop computer, a laptop computer, a personal digital assistant, a cellular telephone, set-top box, music players, web pads, tablet computer systems, or other devices with like capability. To this end, a client 106 may comprise a mobile device as can be appreciated. The client 106 may include, for example various peripheral devices. In particular, the peripheral devices may include input devices, for example such as, a keyboard, keypad, touch pad, touch screen, microphone, scanner, mouse, joystick, or one or more push buttons, etc. The peripheral devices may also include display devices 199, indicator lights, speakers, etc. Specific display devices 199 may be, for example, cathode ray tubes (CRTs), liquid crystal display (LCD) screens, gas plasma-based flat panel displays, LCD projectors, or other types of display devices, etc.

Executed within the client 106 are various applications including a client interface application 193. The client interface application 193 is configured to interact with the network interface application 139 according to an appropriate protocol. To this end, the client interface application 193 may comprise, for example, an appropriate browser application such as INTERNET EXPLORER® sold by Microsoft Corporation of Redmond, Wash., or MOZILLA FIREFOX® which is promulgated by Mozilla Corporation of Mountain View, Calif., or other type of browser application. Alternatively, the client interface application 193 may comprise some other application besides a browser application. Where the client interface application 193 comprises a browser application, it may communicate with the network interface application 139 on the server 103 via a transmission control protocol/Internet protocol (TCP/IP) or other appropriate protocol as can be appreciated. When executed in the client 106, the client interface application 193 renders a user interface 196 on a display device 199 associated with the client 106 and may perform other functions. The client interface application 193 accesses network pages such as web pages or other types of content from the server 103 in order to access the functionality of the review trend generator 146 and other components implemented in the server 103 as will be described.

Figure 2:
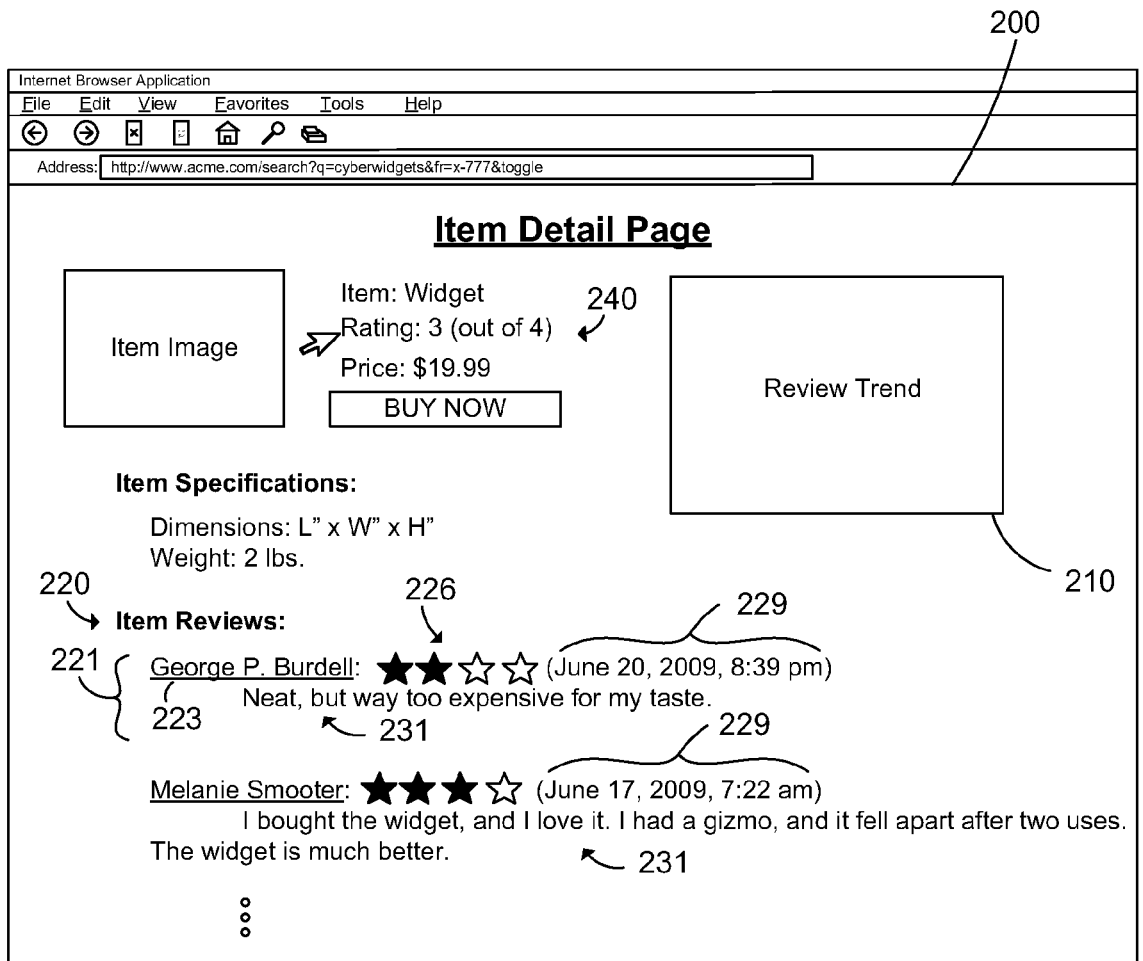
FIG. 2 is a drawing of one example of a user interface rendered on a display device of a client in the data communications network of FIG. 1 according to an embodiment of the present disclosure.

Referring next to FIG. 2, various user interfaces 196 (FIG. 1) generated in association with the operation of the review trend generator 146 (FIG. 1) are described. It is understood that such user interfaces 196 are merely examples of the many different user interfaces 196 that may be generated to accomplish the various purposes discussed. To this end, the components included in the various user interfaces 196 are presented herein as examples, where other types of components may be employed in their place to accomplish the same underlying purpose. Further, the various components may be manipulated using various input devices such as keyboards, a mouse, microphones, and other devices as can be appreciated.

With reference to FIG. 2, shown is one example of a user interface 196, denoted herein as user interface 196a, rendering an item detail page 200. The item detail page 200 is a network page regarding an item, which may include a product, a service, a news article, a web log (blog) post, a social network profile, a website, and/or one or more of a variety of other items that a reviewer might review. The item detail page 200 may be rendered in a user interface 196a on the display device 199 of the client 106 (FIG. 1). Information stored in the data store 153 (FIG. 1) on the server 103 (FIG. 1) may be presented to a user on the item detail page 200 communicated by the network interface application 139 (FIG. 1) over the network 109 (FIG. 1) to the client 106. Also, the user interface 196a provides one example of the many different user interfaces 196 that may be created for different types of display devices 199 (FIG. 1) employed on a respective client 106. For example, the user interface 196a may be formatted differently to fit on a small display screen of a personal digital assistant or other mobile device, etc. Additionally, different graphical user interface (GUI) components may be used.

The item detail page 200 may provide various attributes of the item such as the name of the item (e.g., "Widget"), price, specifications, and an item image. Additionally, the item detail page 200 illustrated in FIG. 2 includes a review trend 210, which will be discussed in further detail with respect to FIGS. 3-6, and a plurality of reviews 220. For example, the plurality of reviews 220 includes a review 221, which includes a rating 226, a comment 231, and a reviewer name 223. The rating 226 (e.g., "2") is indicated by a scale (e.g., "4"). The review 221 is associated with a temporal value 229. The temporal value 229 includes a date value and/or a time value corresponding to when the reviewer entered the review 221 of the item. The item detail page 200 may also provide a simple average rating 240 of the plurality of reviews 220.

Turning next to FIGS. 3-6, various embodiments of a review trend 210 (FIG. 2) included in an item detail page 200 (FIG. 2) generated in association with the operation of the review trend generator 146 (FIG. 1) are described. Each review trend 210 (FIG. 2) is based at least in part upon a plurality of reviews 220 (FIG. 2) and a plurality of temporal values 229 (FIG. 2). As discussed above, each of the temporal values 229 is associated with a respective one of the reviews 221 (FIG. 2) including a rating 226 (FIG. 2) and comments 231 (FIG. 2). In some embodiments, reviews 220 provided by reviewers who have not purchased the item are filtered out of the review trend 210.

Figure 3:
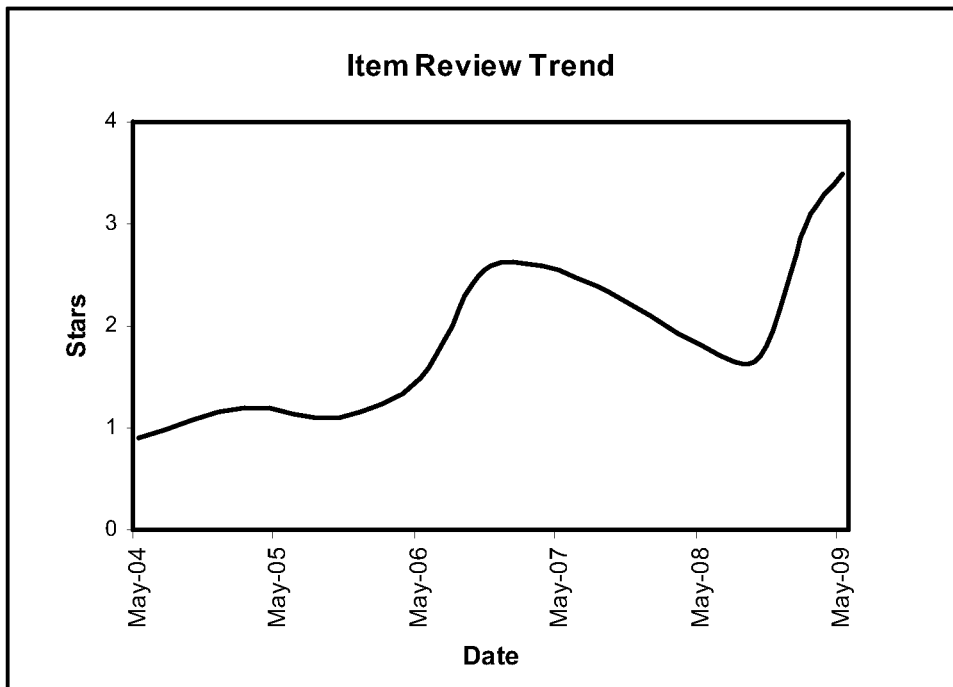
FIGS. 3-7 are a drawings of examples of a review trend displayed as a portion of the user interface of FIG. 2 according to various embodiments of the present disclosure.

With reference to FIG. 3, shown is one example of a review trend 210 (FIG. 2), denoted herein as item review trend 210a. The item review trend 210a is a graphical representation based at least in part upon a plurality of reviews 220 (FIG. 2) corresponding to an item and each respective temporal value 229 (FIG. 2) associated with each review 221 (FIG. 2). Specifically, the item review trend 210a graphically illustrates the rating 226 of each of the plurality of reviews 220 versus each of the associated temporal values 229, which in this example is a month and year. A user viewing the item review trend 210a on an item detail page 200 (FIG. 2) rendered on a user interface 196a (FIG. 2) is enabled to quickly understand how the plurality of reviews 220 have changed over time without having to read each review 221. Moreover, the item review trend 210a is an improvement over the simple average rating 240 (FIG. 2), which may not represent the current general customer opinion and may be skewed based on reviews 221 received earlier in time.

Figure 4:
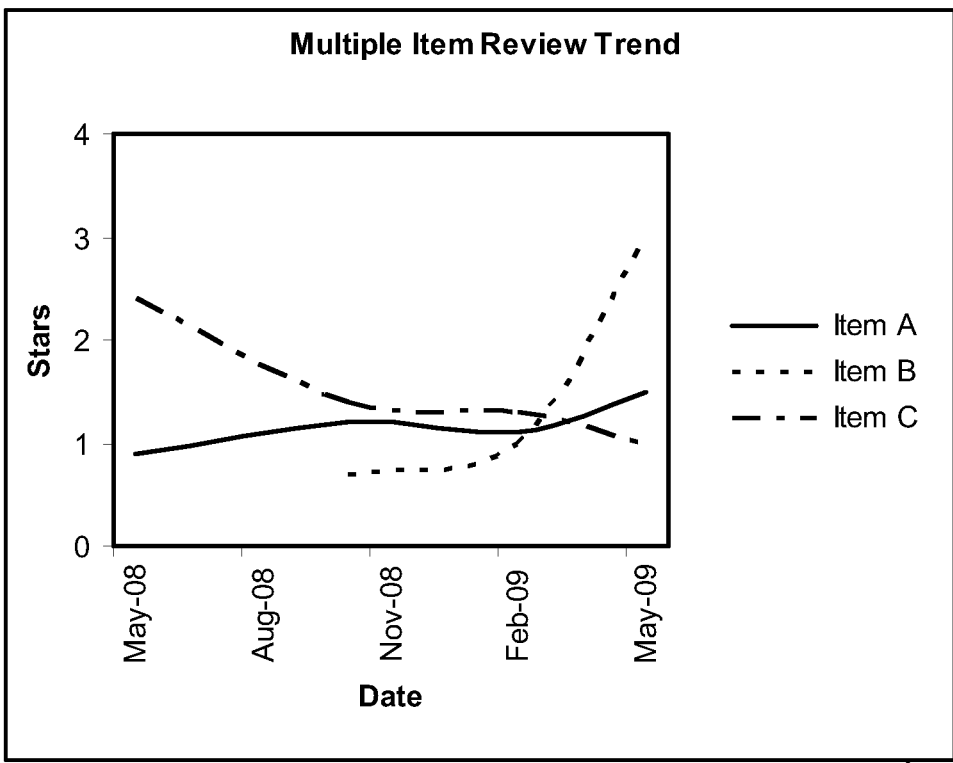

Moving now to FIG. 4, shown is one example of a review trend 210 (FIG. 2), denoted herein as a multiple-item review trend 210b. The multiple-item review trend 210b is a graphical representation based at least in part upon a plurality of reviews 220 (FIG. 2) including subsets of reviews corresponding to multiple items and each of the respective temporal values 229 (FIG. 2) associated with each of the reviews 221. Specifically, the item review trend 210a and multiple-item review trend 210b graphically illustrate the ratings from a plurality of reviews corresponding to an item A, which is a subset of the plurality of reviews 220, versus each of temporal values 229 associated with each of the reviews 221 corresponding to an item A. Further, the multiple-item review trend 210b graphically illustrates the ratings from a plurality of reviews 220 corresponding to an item B, which is a subset of the plurality of reviews 220, versus each of temporal values 229 associated with each of the reviews corresponding to an item B. Likewise, the multiple-item review trend 210b graphically illustrates the ratings from a plurality of reviews 220 corresponding to an item C, which is a subset of the plurality of reviews 220, versus each of temporal values 229 associated with each of the reviews 221 corresponding to an item C.

A user viewing the multiple-item review trend 210b on an item detail page 200 (FIG. 2) rendered on a user interface 196a (FIG. 2) is enabled to quickly understand how the reviews 221 have changed over time without having to read each review 221 as well as determine which item among item A, item B, and item C has the best current general customer opinion. Although not illustrated, the user would be able to select multiple items in the user interface 196 (FIG. 1) for viewing in the multiple-item review trend 210b.

Figure 5:
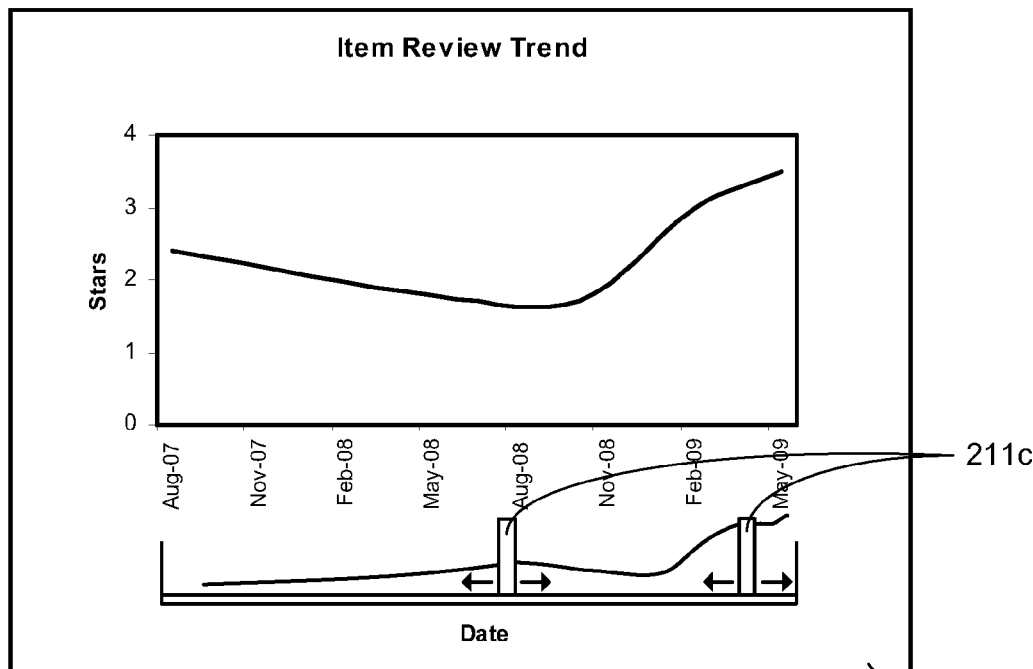

Referring next to FIG. 5, shown is one example of a review trend 210 (FIG. 2), denoted herein as an item review trend 210c. The item review trend 210c is a graphical representation based at least in part upon a plurality of reviews 220 (FIG. 2) corresponding to an item and the respective temporal value 229 (FIG. 2) associated with each review 221 (FIG. 2). Similar to the item review trend 210a (FIG. 3), the item review trend 210c graphically illustrates the ratings of each of the plurality of reviews 220 versus each of the associated temporal values 229, which in this example is a month and year. However, item review trend 210c illustrates a defined temporal range, which may be different from the entire range of temporal values 229 associated with the plurality of reviews 220. A user viewing the item review trend 210c on an item detail page 200 (FIG. 2) rendered on a user interface 196a (FIG. 2) is provided with sliders 211c to adjust the defined temporal range. The sliders 211c allow a user to focus on a temporal range of interest to the user. For example, the sliders 211c allow the user to focus on a set of recently received reviews 221 from the plurality of reviews 220. In some embodiments, the item detail page 200 rendered on the user interface 196a may also include a button to toggle the sliders 211c on and off.

Figure 6:
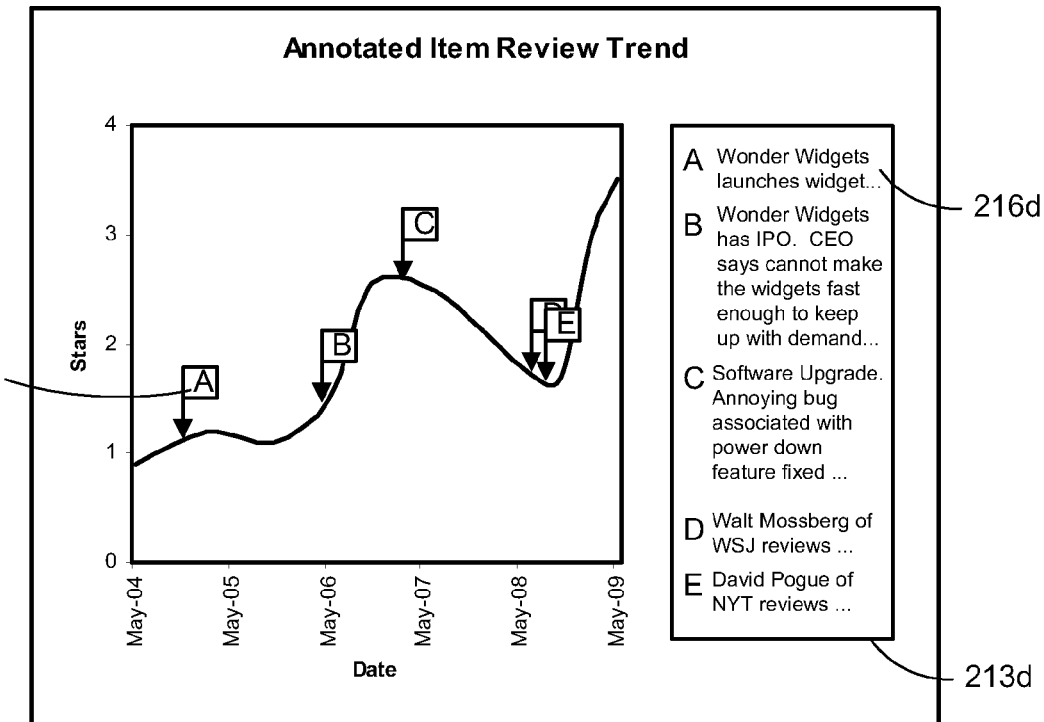

Turning now to FIG. 6, shown is one example of a review trend 210 (FIG. 2), denoted herein as an annotated item review trend 210d. The annotated item review trend 210d is a graphical representation based at least in part upon a plurality of reviews 220 (FIG. 2) corresponding to an item and the respective temporal value 229 (FIG. 2) associated with each review 221 (FIG. 2). Similar to the item review trend 210a (FIG. 3), the annotated item review trend 210d graphically illustrates the ratings of each of the plurality of reviews 220 versus each of the associated temporal values 229.

However, the annotated item review trend 210d also includes a plurality of annotations 216d. Each annotation 216d includes an information update and a corresponding flag 219d. The information update is at least a news article, software update, manufacturer recall, published reviews of the item, etc. At least a portion of the plurality of annotations 216d is included in a legend 213d. Each annotation 216d is associated with a time of occurrence value based on when the information update occurred. Although not illustrated, the flag 219d may include a hyperlink to the corresponding annotation 216d in the legend 213d. In some embodiments, the item detail page 200 (FIG. 2) rendered on the user interface 196a (FIG. 2) may also include a button to toggle the annotations on and off.

The annotated item review trend 210d on the item detail page 200 rendered on a user interface 196a allows a user to quickly deduce the reasons for various inflections shown over time. For example, a software update might improve the performance of a software item, and the improvement would be reflected in the increase of the ratings from the plurality of reviews 220 received subsequent to the software update. A user viewing the annotated item review trend 210d would realize that he might be able to discard reviews 221 entered prior to the software update from his consideration. In contrast, the simple average rating 240 (FIG. 2) would be weighed down by reviews 221 of the non-updated software and would inaccurately represent the current customer opinion of the software item for purchase.

Figure 7:
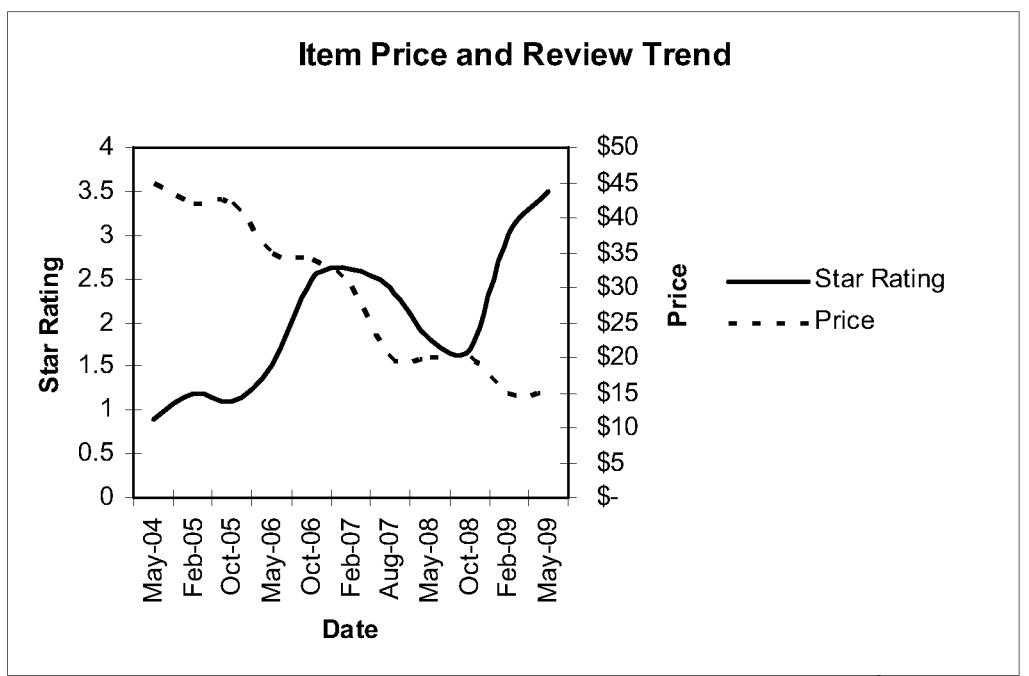

Turning now to FIG. 7, shown is one example of a review trend 210 (FIG. 2), denoted herein as an item price and review trend 210e. The item price and review trend 210e is a graphical representation based at least in part upon a plurality of reviews 220 (FIG. 2) corresponding to an item and the respective temporal value 229 (FIG. 2) associated with each review 221 (FIG. 2). Additionally, a price trend of the price of the item versus time is superimposed on the review trend 210. Hence, a user viewing the item price and review trend 210e would be enabled to compare the change in price over time with the change in the reviews 220.

Figure 8:
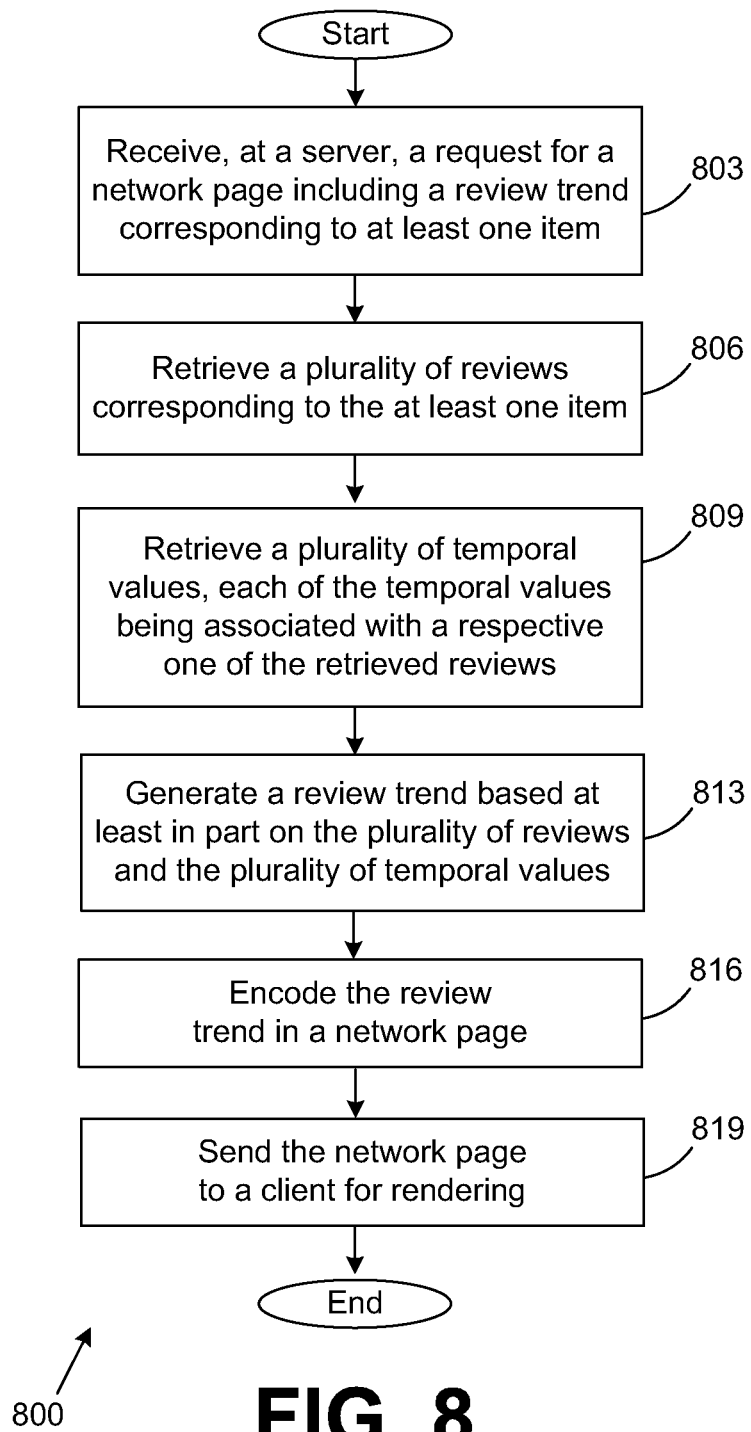
FIG. 8 is one example of a flowchart of functionality and/or steps implemented in a server in the data communications network of FIG. 1 in order to generate a review trend according to an embodiment of the present disclosure.

Referring next to FIG. 8, shown is a flowchart that provides one example of the operation of the review trend generator 146 (FIG. 1) according to an embodiment of the present disclosure. Alternatively, the flowchart of FIG. 8 may be viewed as depicting steps of an example of a method implemented in the server 103 (FIG. 1) according to the various embodiments.

To begin, in box 803, the server 103 receives a request for a review trend 210 (FIG. 2) responding to at least one item. The request may have been generated responsive to a user input received on a user interface 196 (FIG. 1) of a client 106 (FIG. 1) and communicated over the network (FIG. 1) to the server 103 (FIG. 1). In some embodiments, the server 103 receives a request for a network page (e.g., item detail page 200 (FIG. 2)) corresponding to at least one item. Also, in some embodiments, the server 103 receives a request for a review trend 210 (FIG. 2) corresponding to multiple items.

To this end, in box 806, the server 103 retrieves a plurality of reviews 220 (FIG. 2) from the review data 176 (FIG. 1) in item data 153 (FIG. 1) stored in a data store 136 (FIG. 1). In some embodiments, the server 103 retrieves additional data corresponding to the at least one item including attributes 173 (FIG. 1) and news data 183 (FIG. 1). The news data 183 includes the information updates and time of occurrence value discussed above with respect to FIG. 6.

Further, in box 809, the server 103 retrieves a plurality of temporal values 229 (FIG. 1) from the review data 176 in item data 153 stored in a data store 136. Each of the temporal values 229 is associated with a respective one of the plurality of reviews 220. Specifically, each temporal value 229 is based at least in part upon when the associated review 221 was received. To this end, in boxes 806 and 809, the server 103 accesses the item data 153 in accordance with any limitations specified. For example, the review data 176 in the item data 153 may be accessed from nonvolatile memory storage and placed in random access memory or other such type of memory for active calculation.

Thereafter, in box 813, the review trend generator 146 (FIG. 1) generates a review trend 210 based at least in part on the plurality of reviews 220 and the plurality of temporal values 229. For example, the review trend generator 146 generates a review trend 210 based at least in part on the rating 226 in each of the reviews 221 as well as the plurality of temporal values 229. To this end, the review trend generator 146 accesses the plurality of reviews 220 and temporal values 229 in accordance with any limitations specified. In some embodiments, the review trend generator 146, when generating the review trend 210, processes a rolling average function, a window function, a Steklov function, a curve smoothing function, a filtration function, a weighted average function, and/or other functions based at least in part upon the plurality of reviews 220. For example, the filtration function may filter out reviews 221 received from reviewers who are not also purchasers of the item. As another example, the weighted average function may deemphasize older reviews 220, which may no longer be relevant, or deemphasize high volume bursts of reviews 220 that may be associated with spam or other abuse. In other words, processing the weighted average function deemphasizes reviews received during a period when a large number of reviews are received relative to other periods when reviews are received. Also, the weighted average function emphasizes reviews received during the other periods as well.

Also, in some embodiments, the review trend generator 146 adds code or provides functionality for sliders 211c (FIG. 5) to the item detail page 200 including the review trend 210. As discussed above regarding FIG. 5, the sliders 211c enable a user to use the user interface 196 (FIG. 1) to define a temporal range for viewing the review trend 210.

Additionally, in some embodiments, the review trend generator 146 adds an annotation 216d (including an information update) and a corresponding flag 219d, a legend 213d, and/or other information to the review trend 210 in box 813. The addition of the annotation 216d may further add a hyperlink to the flag 219d that corresponds to an information update in the legend 213d.

Thereafter, in box 816, the review trend encoder 150 (FIG. 1) encodes the review trend 210 generated by the review trend generator 146 for rendering in a user interface 196 displayed in a display device 199 (FIG. 2) of a client 106. In some embodiments, the review trend encoder 150 encodes the review trend 210 in a network page (e.g., item detail page 200). For example, the review trend encoder 150 may encode the review trend 210 according to a HyperText Transfer Protocol (HTTP). After the review trend 210 is encoded, one or more network interface application(s) 139 sends the review trend 210 from the server 103 over the network 109 to the client 106 for rendering on a user interface 196.

In some embodiments, the review trend 210 includes a dynamic review trend based at least in part upon one or more dynamic reviews stored in item data 153. A dynamic review includes an original review 221 (including a particular rating 226, comments 231, and associated temporal value 229 corresponding to when the original review 221 was received by the server 103) and reviewer specifications regarding updating the original review 221 or generating a later review 221, which was previously nonexistent and thus is a new review 221. In some embodiments, the dynamic review is precomputed (before a request for a review trend 210 is received) and stored as dynamic review data 179 (FIG. 1).

In some embodiments, the original review 221 may be updated upon the occurrence of a condition specified by a reviewer. In some embodiments, the condition is a change in a property of the item. For example, the reviewer may provide an original review 221 including a first rating 226 corresponding to a first price, and the reviewer may further provide instructions that the review 221 be changed to have a second rating 226 corresponding to a price less than or equal to a second price. If the price of the item later changes to be less than or equal to a second price, the rating 226 of a review 221 is updated to include the second rating 226 and the temporal value 229 is updated according to when the change to the second price occurred.

In some embodiments, a new review 221 is generated responsive the occurrence of the user-specified condition. The new review 221 includes a new rating 226 that is associated with a new temporal value 229 based at least in part upon when the user-specified condition occurred. Thus, the plurality of reviews 220 would include the original review 221 as well as further dynamically generated reviews 221. To this end, the review trend 210 including a dynamic review trend 210 based at least in part upon one or more dynamic reviews 221 provides a user with a way to have an updated view of customer opinions of the item over time.

With reference to FIG. 9, shown is one example of a user interface 196 (FIG. 1), denoted herein as user interface 196b, rendering a dynamic review page 900, which is an interactive network page regarding an item configured to receive a user input. The dynamic review collector 143 (FIG. 1) in the electronic commerce application(s) 133 (FIG. 1) generates the dynamic review page 900 responsive to a request to create a review 221 entered by a user on the user interface 196 (FIG. 1) and generates a dynamic review based at least in part upon a review 221 entered by a reviewer and the user's specifications regarding updating the original review 221 or generating a previously nonexistent review (i.e., a new review 221). As illustrated in FIG. 9, the dynamic review page 900 allows the reviewer to enter an original review 221 and select whether to create a dynamic review 221. If the user indicates an intent to create a dynamic review 221, the dynamic review page 900 allows the user to determine whether the original review 221 is updated or another review 221 is created when a condition occurs. Further, the dynamic review page 900 provides fields for the user to specify the condition and a new rating 226 corresponding to the occurrence of the condition. In some embodiments, a list of possible predefined conditions (e.g., software update, newer model, positive reviews in the news, etc.) may be provided for the user to select instead of providing a field for the user to specify the condition.

Additionally, in some embodiments, the review trend 210 includes various filtering of the plurality of reviews 220 according to a criterion. For example, the review trend 210 may only include a review trend 210 of dynamic reviews where a new review 221 is generated or an original review 221 is updated. As another example, the review trend 210 may only include reviews 220 provided by purchasers of the item. As yet another example, the review trend 120 may include an indication of the percentage of reviews 220 out of the plurality of reviews 220 including an original review 221 that is updated or a new review 221 is generated.

Further, in some embodiments, when a review trend 210 in an item detail page 200 includes a dynamic review that is updated because a new model of the corresponding item is available (e.g., the condition of a new model being available occurs), the item detail page 200 may be encoded such that user would be redirected to a different item detail page 200 regarding the new model of the item.

Figure 10:
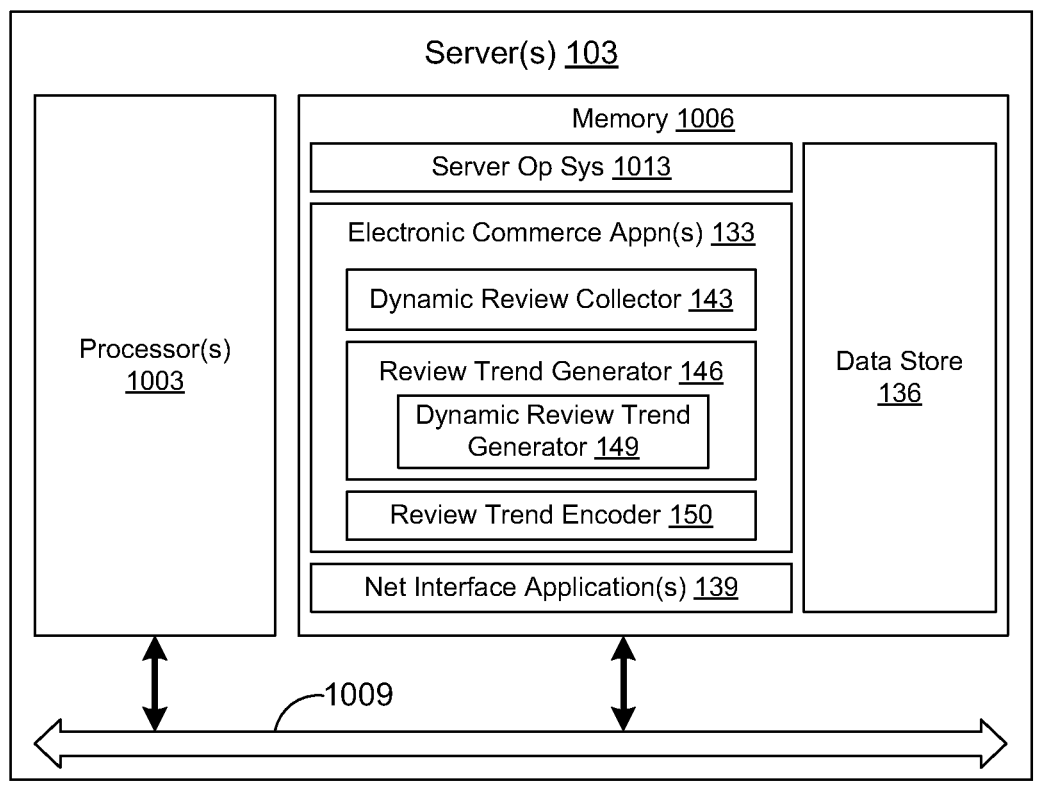
FIG. 10 is a schematic block diagram that illustrates one example of a server in the data communications network of FIG. 1 according to an embodiment of the present disclosure.

Referring next to FIG. 10, shown is a schematic block diagram of one example of the server 103 (FIG. 1) according to an embodiment of the present disclosure. The server 103 includes at least one processor circuit, for example, having a processor 1003 and a memory 1006, both of which are coupled to a local interface 1009. To this end, the server 103 may comprise, for example, a server computer or like device. The local interface 1009 may comprise, for example, a data bus with an accompanying address/control bus or other bus structure as can be appreciated.

Stored in the memory 1006 are both data and several components and/or applications that are executable by the processor 1003. In particular, stored in the memory 1006 and executable by the processor 1003 are a server operating system 1013, the electronic commerce applications 133 (FIG. 1) (including the review trend generator 146 (FIG. 1), the review trend encoder 150 (FIG. 1), and the dynamic review collector 143 (FIG. 1)), the network interface application(s) 139 (FIG. 1), and potentially other applications. Also, stored in the memory 1006 is the data store 136 (FIG. 1) in which the various data described above may be stored so as to be accessible to the processor 1003. It is understood that there may be other applications that are stored in the memory 1006 and are executable by the processor 1003 as can be appreciated. Also, other data may be stored in the memory 1006 and accessed by the processors 1003.

A number of software components are stored in the memory 1006 and are executable or executed by the processor 1003. In this respect, the term "executable" means a program file that is in a form that can ultimately be run by the processor 1003. Examples of executable programs may be, for example, a compiled program that can be translated into machine code in a format that can be loaded into a random access portion of the memory 1006 and run by the processor 1003, source code that may be expressed in proper format such as object code that is capable of being loaded into a random access portion of the memory 1006 and executed by the processor 1003, or source code that may be interpreted by another executable program to generate instructions in a random access portion of the memory 1006 to be executed by the processor 1003, etc. An executable program may be stored in any portion or component of the memory 1006 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1006 is defined herein as both volatile and nonvolatile memory and data storage components. Volatile components are those that do not retain data values upon loss of power. Nonvolatile components are those that retain data upon a loss of power. Thus, the memory 1006 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 1003 may represent multiple processors and the memory 1006 may represent multiple memories that operate in parallel. In such a case, the local interface 1009 may be an appropriate network that facilitates communication between any two of the multiple processors 1003, between any processor 1003 and any one of the memories 1006, or between any two of the memories 1006, etc. The local interface 1009 may comprise additional systems designed to coordinate this communication, including, for example, performing load balancing. The processor 1003 may be of electrical or of some other available construction.

The various applications described above may be implemented using any one or more of a number of programming languages such as, for example, C, C++, C#, Visual Basic, VBScript, Java, JavaScript, Perl, Ruby, Python, Flash, or other programming languages.

Although the various applications described above may be embodied in software or code executed by general purpose hardware, as an alternative the same may also be embodied in dedicated hardware or a combination of software/general purpose hardware and dedicated hardware. If embodied in dedicated hardware, the same can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The block diagrams and/or flowcharts of FIGS. 1, 8 and 9 show the functionality and operation of an implementation of the various applications described above. If embodied in software, each of the various blocks described may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowchart of FIG. 8 shows a specific order of execution, it is understood that the order of execution may differ from that which is depicted. For example, the order of execution of two or more blocks may be scrambled relative to the order shown. Also, two or more blocks shown in succession in FIG. 8 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, where the various applications described herein comprise software or code, each can be embodied in any computer-readable medium for use by or in connection with an instruction execution system such as, for example, a processor in a computer system or other system. In this sense, the applications may comprise, for example, statements including instructions and declarations that can be fetched from the computer-readable medium and executed by the instruction execution system. In the context of the present disclosure, a "computer-readable medium" can be any medium that can contain, store, or maintain logic or code for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising:
   receiving, by at least one server computing device, a request for a review trend corresponding to at least one item;
   generating, by the at least one server computing device, the review trend corresponding to the at least one item, wherein the review trend graphically illustrates a plurality of reviews of the at least one item versus a plurality of temporal values, individual ones of the reviews comprising a rating provided in association with a purchase of the at least one item, individual ones of the temporal values being associated with a respective one of the reviews, wherein the review trend is generated for a range of the temporal values using a weighted average function that deemphasizes a first subset of the reviews in the review trend received during a first period when a large number of reviews are received relative to a second period, the weighted average function emphasizing a second subset of the reviews received during the second period in the review trend;

generating, by the at least one server computing device, a plurality of flags for display in association with respective portions of the review trend, individual ones of the flags corresponding to at least one annotation that describes an information update associated with the at least one item, wherein a selection of a respective one of the flags is configured to cause a rendering of the at least one annotation in association with the review trend; and encoding, by the at least one server computing device, user interface data comprising the review trend and the plurality of flags for rendering on a client device.

2. The method of claim 1, wherein the request for the review trend is a request for the review trend to be included in a network page.

3. The method of claim 2, wherein the request for the network page is based at least in part upon a user input.

4. The method of claim 3, wherein the user input includes a set of items.

5. The method of claim 3, wherein the user input is a range of temporal values.

6. The method of claim 2, further comprising sending, the at least one server computing device, the network page to the client device for rendering.

7. The method of claim 1, further comprising:
retrieving, by the at least one server computing device, from a memory the plurality of reviews corresponding to the at least one item; and
retrieving, by the at least one server computing device, from the memory the temporal values associated with individual ones of the reviews as retrieved.

8. The method of claim 1, further comprising generating, by the at least one server computing device, a previously nonexistent review corresponding to the at least one item based at least in part upon a dynamic review that modifies the rating provided in association with the at least one item upon an occurrence of a predefined condition.

9. The method of claim 8, wherein the predefined condition is a change in a property of the at least one item.

10. The method of claim 8, wherein the previously nonexistent review comprises a previously nonexistent rating received as user input and a previously nonexisting temporal value.

11. The method of claim 1, wherein the review trend is generated using at least one of: a rolling average function, a window function, a Steklov function, a curve smoothing function, and a filtration function.

12. The method of claim 1, wherein the at least one item comprises a first item and a second item;
wherein the plurality of reviews comprises a first plurality of reviews for the first item and a second plurality of reviews for the second item; and further comprising retrieving, by the at least one server computing device, the second plurality of reviews corresponding for the second item, wherein the request sent to the server is for the review trend comprising information pertaining to the first item and the second item.

13. The method of claim 1, wherein the information update is at least one of: a news article associated with the at least one item, a software update associated with the at least one item, a manufacturer recall associated with the at least one item, or publication of a review of the at least one item.

14. A system, comprising:
at least one computing device;
program instructions executable in the at least one computing device that, when executed by the at least one computing device, cause the at least one computing device to:
generate a review trend for an item specified in a request made through a client device, the review trend comprising a graph generated based at least in part upon a plurality of reviews of the item with respect to a plurality of temporal values, individual ones of the reviews of the item comprising a user-providing rating associated with a purchase of the item, individual ones of the temporal values being associated with a respective one of the reviews of the item, wherein the review trend is generated for a range of the temporal values using a weighted average function that deemphasizes a first subset of the reviews in the review trend received during a first period when a large number of reviews are received relative to a second period, the weighted average function emphasizing a second subset of the reviews received during the second period in the review trend;
generate at least one flag for display in association with the review trend, the at least one flag corresponding to an annotation that comprises an information update associated with the item;
encode user interface data for a display of the review trend and the at least one flag; and
cause a transmission of the user interface data to the client device for the display of the review trend and the at least one flag.

15. The system of claim 14, wherein the review trend is one of a plurality of review trends; and
further comprising memory accessible by the at least one computing device that stores the plurality of review trends.

16. The system of claim 14, wherein the review trend is generated by processing at least one of: a rolling average function, a window function, a Steklov function, a curve smoothing function, and a filtration function.

17. The system of claim 14, wherein the range of the temporal values is obtained through a slider component of a user interface generated on the client device using the user interface data.

18. The system of claim 14, wherein the graph comprises the review trend plotted in association with a price of the item over time.

19. A non-transitory computer readable medium embodying program code executable on at least one computing device that, when executed by the at least one computing device, causes the at least one computing device to:
access a plurality of reviews from memory corresponding to at least one item available for consumption in an electronic marketplace and a plurality of temporal values, individual ones of the reviews comprising a user-specified rating associated with the at least one item, individual ones of the temporal values being associated with a respective one of the reviews;

generate a review trend for the at least one item, wherein the review trend graphically illustrates the reviews of the at least one item versus the temporal values, wherein the review trend is generated for a range of the temporal values using a weighted average function that deemphasizes a first subset of the reviews in the review trend generated during a first period when a large number of reviews are made relative to a second period, the weighted average function emphasizing a second subset of the reviews generated during the second period in the review trend;

generate at least one icon in at least one area of the review trend, the at least one icon corresponding to an annotation describing an update associated with the at least one item;

generate user interface data that causes a display of the review trend and the at least one flag; and cause a transmission of the user interface data to a client device for the display of the review trend and the at least one flag.

20. The non-transitory computer readable medium of claim 19, further comprising program code that, when executed, causes the at least one computing device to update a respective one of the reviews based at least in part on a dynamic one of the reviews that modifies the dynamic one of the reviews provided in association with the at least one item in response to an occurrence of a predefined condition associated with the at least one item.

21. The non-transitory computer readable medium of claim 20, wherein the dynamic one of the reviews is updated responsive to a condition of a new model of the at least one item being available.

22. The non-transitory computer readable medium of claim 20, further comprising program code that, when executed by the at least one computing device, causes the at least one computing device to generate a previously nonexistent review corresponding to the at least one item based at least in part on the dynamic one of the reviews.

23. The non-transitory computer readable medium of claim 22, wherein the previously nonexistent review comprises a previously nonexistent rating received as user-provided input and a previously nonexistent temporal value.

24. The non-transitory computer readable medium of claim 19, wherein the review trend is generated by processing at least one of: a rolling average function, a window function, a Steklov function, a curve smoothing function, and a filtration function.

* * * * *

UNITED STATES PATENT AND TRADEMARK OFFICE
CERTIFICATE OF CORRECTION

PATENT NO. : 9,686,341 B1
APPLICATION NO. : 12/544583
DATED : June 20, 2017
INVENTOR(S) : Mohsinally et al.

Page 1 of 1

It is certified that error appears in the above-identified patent and that said Letters Patent is hereby corrected as shown below:

In the Claims

At Column 12, Line 3, in Claim 12, delete "corresponding for the second item, wherein the request", and replace with --corresponding to the second item, wherein the request--

And

At Column 12, Lines 24-25, in Claim 14, delete "ones of the reviews of the item comprising a user-providing rating associated with a purchase of the", and replace with --ones of the reviews of the item comprising a user-provided rating associated with a purchase of the--

And

At Column 13, Line 25, in Claim 19, delete "least one flag.", and replace with --least one icon.--

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*